Figure 1:
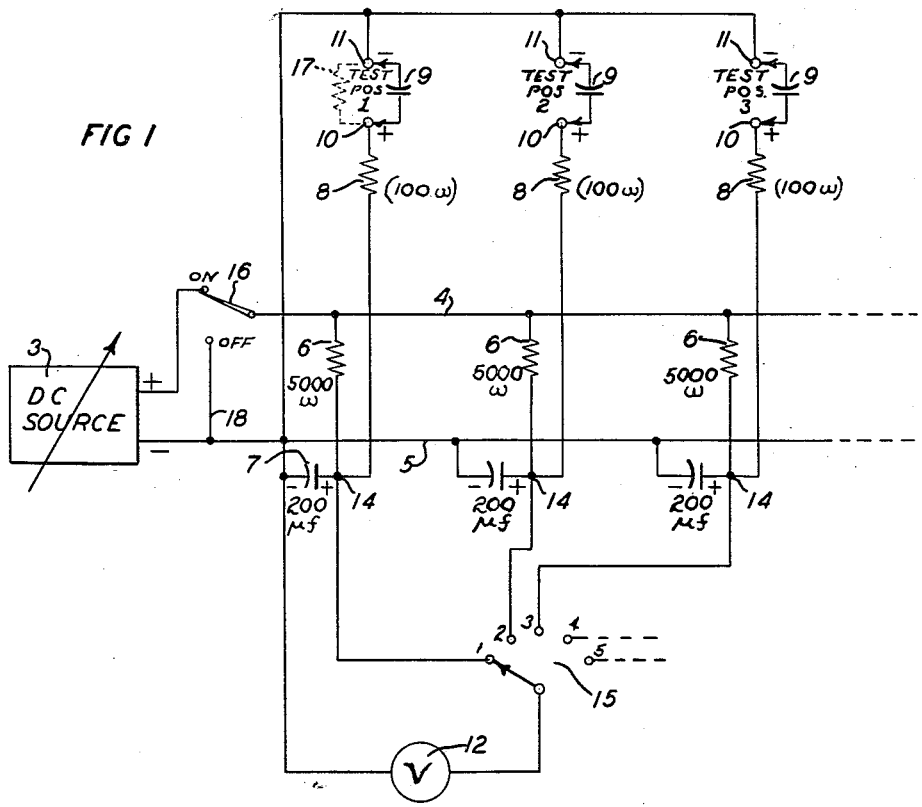

April 16, 1957  G. MINCHENKO ET AL  2,789,196
APPARATUS FOR DIELECTRIC TESTING
Filed Nov. 18, 1955

INVENTORS
W. CHEPULIS
G. MINCHENKO

BY
*[signature]*

ATTORNEY

United States Patent Office 2,789,196
Patented Apr. 16, 1957

2,789,196

APPARATUS FOR DIELECTRIC TESTING

George Minchenko, Salem, Mass., and William Chepulis, Methuen, N. H., assignors to Western Electric Company, Incorporated, New York, N. Y., a corporation of New York Application November 18, 1955, Serial No. 547,706

2 Claims. (Cl. 219—19)

This invention relates to test apparatus and particularly to apparatus for over-voltage testing of dry electrolytic or metallized paper type capacitors.

In the manufacture of dry electrolytic capacitors such as the tantalum type, uncontrolled metallic spray (i. e. tiny particles of tin spray from the outer coating of the capacitors) usually short circuit the electrodes. Frequently no direct short circuit will exist, however, these particles create a danger of capacitor breakdown when specified working voltages are applied thereto. It is necessary, therefore, to subject the capacitors to a "burn-out" or over-voltage test which accomplishes two purposes, namely, it removes short circuiting particles or faults which will burn-out (hence the name "burn-out" test) and secondly it verifies the ability of the capacitor to withstand specified working voltages.

Heretofore, test sets for gradually applying a test potential across the electrodes of the capacitors for performing such "burn-out" or over-voltage tests were operated manually. However, such manual operation was found unsatisfactory for mass production purposes. While the operator gradually applied the test voltage in such test sets, he was constantly required to watch the current in the capacitor under test and to instantly remore or reduce the applied potential at the slightest breakdown indication or else excessive current through the capacitor would cause overheating (due to a short circuiting condition) and thereby ruin the capacitor. This procedure had to be carried on repeatedly until the maximum prescribed voltage was reached. It is obvious that the operator was subjected to a considerable physical and mental strain in operating such test sets which, of course, was undesirable for mass production testing. In addition, this manual testing would permit testing only one capacitor at a time.

The principal object of this invention is apparatus for automatically and simultaneously over-voltage testing a plurality of such capacitors without subjecting them to excessive currents.

In accordance with the general features of the invention, a plurality of large test capacitors are individually charged from a common source through large fixed impedance elements, which determine their charging rate, to provide separate, gradually increasing test potentials for each of a plurality of test positions in which capacitors to be tested are connected. While the test potentials build up to the prescribed value, short circuiting conditions may appear at various potential levels in the capacitors being tested. When such a condition arises, the associated test capacitor discharges through the short circuit path in the capacitor under test thereby providing a pulse of energy which in most cases, burns out the fault. An impedance (of relatively low magnitude compared to the aforementioned fixed impedance elements) in the discharge path of each of the test positions softens the shock of the energy pulse to the capacitors under test and limits the current therein. If the discharge of the test capacitors fails to clear the faults, the maximum current through capacitors under test is limited to a much lower value by the large fixed impedance elements thereby preventing overloading the source.

Figure 2:
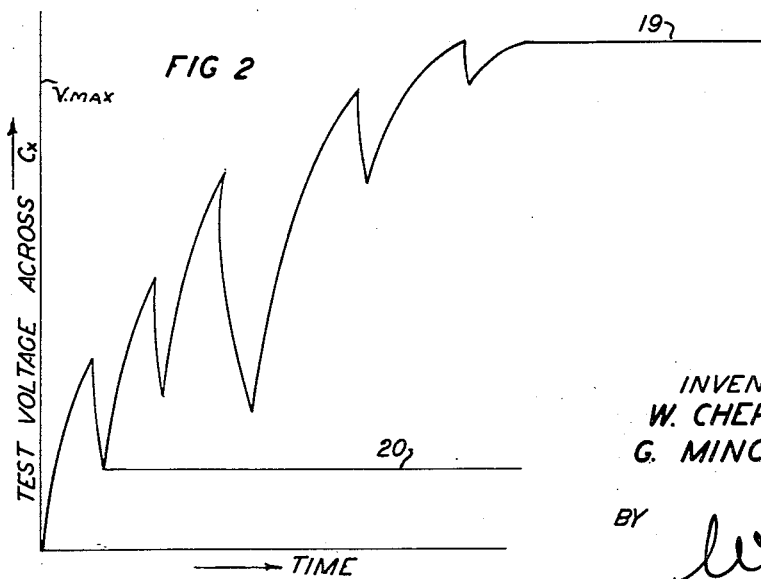

These and other features of the invention will be more fully understood from the following detailed description taken in conjunction with the accompanying drawing, in which:

Fig. 1 is a circuit diagram of the over-voltage test circuit of the invention especially adapted to testing dry electrolytic tantalum capacitors, and Fig. 2 shows typical test voltage vs. time curves for a good and an incurable tested capacitor.

In the over-voltage test circuit shown in the drawing for testing tantalum capacitors ranging from one to one hundred microfarads, a variable output, low impedance direct current source 3 supplies power to positive and negative feed lines 4 and 5 respectively across which a plurality of 5000 ohm resistors 6 and 200 microfarad test capacitors 7 are connected. A plurality of test branches which include test terminals 10 and 11 for receiving capacitors 9 to be tested and 100 ohm series resistance elements 8 are connected in parallel with the test capacitors 7, terminals 11 of the test positions being connected directly to the negative feed line 5 (which is connected to one side of the capacitors 7) and terminals 10 of the test positions being connected to the positive side 14 of the capacitors through the resistors 8. A voltmeter 12 is connected between the negative line 5 and the positive side 14 of any one of the capacitors 7 through a selector switch 15 so that the potential across any one of the test branches may be observed when desired. A control switch 16 is connected between line 4 and the direct current source 3. The "off" position of the switch short circuits line 4 to line 5 through lead 18 so that when the switch is in the "off" position the capacitors 7 and 9 may be short circuited to discharge them and prepare the test set for the next test.

Resistors 6 are selected to limit the short circuit current (after discharge pulses) to approximately 4 milliamperes. The size of the condensers 7 (200 microfarads) is such as to produce a one to one and a half second time constant with resistors 6 to provide a short test cycle since the capacitors 7 may build up to maximum potential in about five seconds. The resistors 8 have an impedance of about 100 ohms to limit the test capacitor discharge pulses through the test branches to about 10 milliamperes for maximum prescribed test voltage which may range between 16 and 65 volts. With this proportioning, the short circuit current through the capacitors 9 under test is sufficient to burn out most of the faults yet not excessively high or of such duration to permanently damage the capacitors 9.

In operation, a resistance element 17 of about one half megohm impedance is connected across the terminals 10 and 11 of one of the test positions prior to inserting the capacitors to be tested. This resistance represents the approximate leakage resistance of one of the capacitors under test. The switch 15 is thrown to the position corresponding to the test position in which this impedance is inserted and the switch 16 is thrown to its "on" position. The output voltage of the source 3 is adjusted until the voltmeter 12 indicates the specified test voltage. After the test voltage has been set the switch 16 is turned to its "off" position, the resistance element 17 removed from the test position and the test positions are supplied with capacitors to be tested. The power connection is then restored by throwing switch 16 to the "on" position and the test voltage starts building up across capacitors 7 and across the capacitors 9 in the test positions. In the case of a flash-over in one of the capacitors 9, the increased current resulting therefrom causes a high voltage drop across the corresponding resistor 6 and thereby effectively reduces the voltage drop across the corresponding capacitor 7 and therefore across the capacitor 9 which has failed. At the same time the accumulated charge in the capacitor 7 is discharged through the short circuiting or conductive path in the capacitor 9 thereby providing a short pulse of current which is of a magnitude sufficient to burn out the fault (the metallic particle causing the short circuit condition). Once the fault is burned out, the test voltage again builds up until the next flash-over level is reached when this circuit operation is repeated. Such operation is continued until the capacitors 9 are cleared of all faults encountered with the prescribed maximum voltage or are found to be incurably defective. Due to the short time constants of the test capacitor circuits, the total test time is very short.

The voltmeter 12 is selectively connected to each test position by operating switch 15 to identify the good from the incurable tested capacitors, the voltmeter showing a steady maximum voltage value for the good units and a steady subnormal value for the incurable units. A typical curve for a tested capacitor is shown in Fig. 2 in which the test voltage across a good and an incurable capacitor is plotted against time. The breaks in the curves represent flash-overs or short circuit conditions and once the faults are burned out, the normal prescribed potential 19 is reached. In the case of the incurable capacitor, the start of the curve may be the same as for a good unit, however, if the fault is not burned out, it will become steady at a sub normal value as seen by curve 20.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. Apparatus for simultaneously over-voltage testing a plurality of capacitors to burn out short circuiting conductive particles between the electrodes thereof comprising a low impedance direct current power source, a plurality of test branches each having a test position for receiving capacitors to be tested and an impedance element connected in series therewith for limiting discharge current through capacitors in the test positions, a test capacitor for each of the test branches, an impedance element in series with each test capacitor, means for connecting the serially connected test capacitors and impedance elements across the source to gradually charge the capacitors, and means for connecting the test branches in parallel with the corresponding test capacitors, the impedance of each of the test branch impedance elements being sufficient to reduce to a safe level large test capacitor discharge current pulses from passing through short circuiting faults in capacitors under test without permanently damaging them and the impedance of each of the elements in series with the test capacitor being sufficient to prevent overloading the source in the event of sustained faults in capacitors under test.

2. Apparatus for simultaneously over-voltage testing a plurality of capacitors to burn out short circuiting conductive particles between the electrodes thereof comprising a low impedance direct current power source, a plurality of test branches each having a test position for receiving capacitors to be tested and a resistance element connected in series therewith for limiting discharge current through capacitors in the test positions, a test capacitor for each of the test branches, a resistance element in series with each test capacitor, means for connecting the serially connected test capacitors and resistance elements across the source to gradually charge the capacitors, and means for connecting the test branches in parallel with the corresponding test capacitors, the impedance of each of the test branch resistance elements being sufficient to reduce to a safe level large test capacitor discharge current pulses from passing through short circuiting faults in capacitors under test without permanently damaging them and the impedance of each of the elements in series with the test capacitor being substantially larger than the test branch resistance elements to prevent overloading the source in the event of sustained faults in capacitors under test.

References Cited in the file of this patent

UNITED STATES PATENTS

| | | |
|---|---|---|
| 1,337,245 | MacPherson | Apr. 20, 1920 |
| 1,944,211 | Brodie | Jan. 23, 1934 |
| 2,070,435 | Katzman | Feb. 9, 1937 |
| 2,280,119 | Gorman et al. | Apr. 21, 1942 |
| 2,532,336 | Rubelo | Dec. 5, 1950 |
| 2,603,737 | Edman | July 15, 1952 |
| 2,614,152 | Herborn | Oct. 14, 1952 |
| 2,671,157 | Dubilier | Mar. 2, 1954 |